Dec. 31, 1957     C. J. GOESKE     2,818,298
AUXILIARY SUNSHADE ATTACHMENT FOR VISORS
Filed March 19, 1956     2 Sheets-Sheet 1
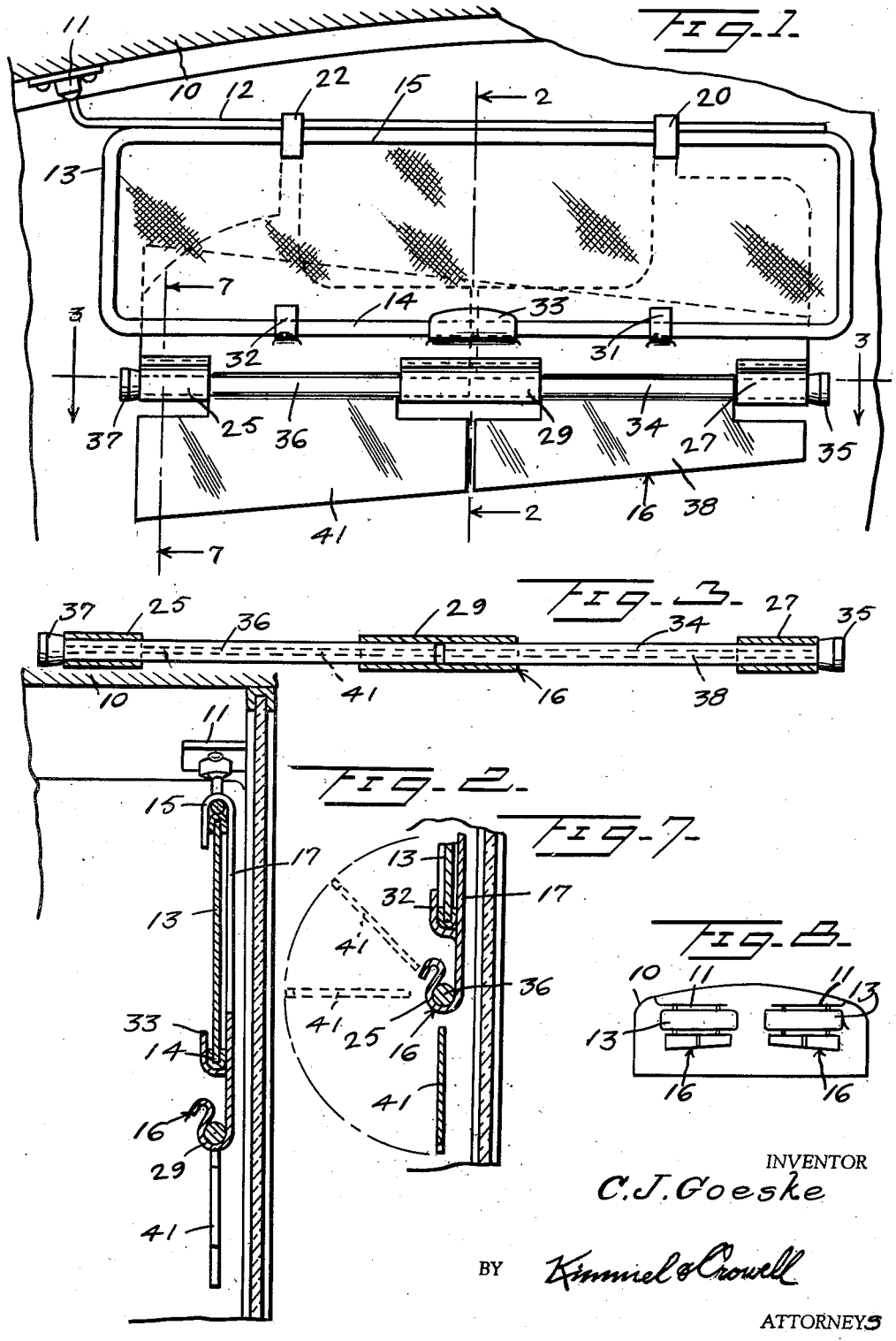
INVENTOR
C. J. Goeske
BY Kimmel & Crowell
ATTORNEYS

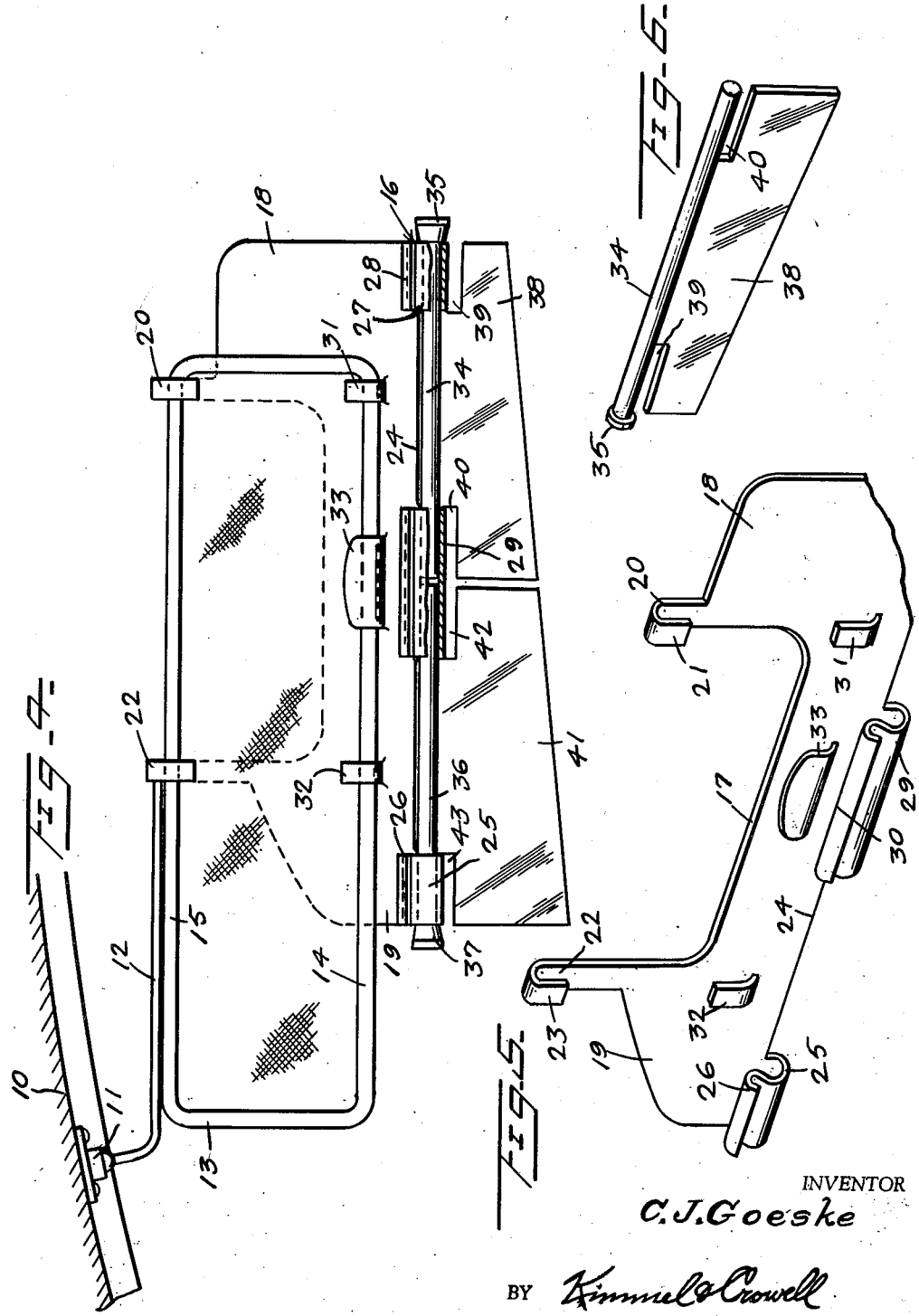

2,818,298

AUXILIARY SUNSHADE ATTACHMENT FOR VISORS

Charles J. Goeske, Henryette, Okla.

Application March 19, 1956, Serial No. 572,484

2 Claims. (Cl. 296—97)

The present invention relates to auxiliary sunshade attachment for visors, and more particularly, to such devices which through their adjustability greatly increase the effectiveness of the visor conventionally used in a motor vehicle.

The primary object of the invention is to provide an auxiliary sunshade attachment for visors which increases the effective utility of the normal visor both in a lateral and a vertical direction.

A further object of the invention is to provide an auxiliary sunshade attachment for visors which can be attached and detached from the conventional visor without the use of tools of any kind.

A further object of the invention is to provide an auxiliary sunshade attachment for visors which can be utilized for reducing the dangerous effect of sun rays entering the car from the windshield or the side window and striking the driver's eyes.

A still further object of the invention is to provide an auxiliary sunshade attachment for visors which will be inexpensive to manufacture, easy to attach and use, and simple to adjust.

Other objects and advantages will become apparent in the following specification when considered in the light of the attached drawing, in which:

Figure 1 is a front elevation of the invention shown attached to a sun visor of conventional construction.

Figure 2 is a vertical cross-section taken along the line 2—2 of Figure 1, looking in the direction of the arrows.

Figure 3 is a horizontal cross-section taken along the line 3—3 of Figure 1, looking in the direction of the arrows.

Figure 4 is a front elevation of the invention shown in laterally adjusted position.

Figure 5 is a detail perspective view of the mounting plate partially broken away for clarity.

Figure 6 is a detail perspective view of one of the shade members.

Figure 7 is a vertical cross-section taken along the line 7—7 of Figure 1, looking in the direction of the arrows.

Figure 8 is a diagrammatic rear elevation of the shield attached to both right and left sun visors.

Referring now to the drawings in detail wherein like reference numerals indicate like parts throughout the several figures, the reference numeral 10 indicates the roof of a motor vehicle having a mounting bracket 11 secured thereto. An arm 12 extends from the bracket 11 laterally across the vehicle and carries an opaque sun visor 13 thereon in a conventional manner. The sun visor 13 is of generally rectangular configuration and is provided with a lower edge 14 and an upper edge 15 extending parallel thereto.

Most motor vehicles are provided with a pair of the sun visors 13 which extend from a pair of oppositely disposed brackets 11 which are secured to opposite side edges of the roof 10 of the motor vehicle.

An auxiliary sunshade attachment generally indicated at 16 includes an opaque mounting plate 17 having an upwardly projecting glare fender portion 18 formed adjacent one end thereof and an upwardly extending glare fender portion 19 formed adjacent the opposite end thereof. A hook 20 is formed integrally with the glare fender portion 18 and is provided with a reverted end portion 21. A hook 22 is formed integrally with the glare fender portion 19 and is provided with a reverted end portion 23. The mounting plate 17 is provided with a relatively straight bottom edge 24 from which extends an arcuate bracket 25 underlying the glare fender portion 19 with the arcuate bracket 25 terminating in a reverted edge 26.

An arcuate bracket 27 extends from the edge 24 of the mounting plate 17 from a point disposed beneath the glare fender portion 18 thereof. The terminal edge of the bracket 27 is provided with a reverted portion 28 similar to the reverted portion 26 of the bracket 25.

An arcuate bracket 29 is formed to extend from the edge 24 at a medial point mid-way between the brackets 25 and 27. The bracket 29 is somewhat longer than the brackets 25 and 27 and is likewise provided with a reverted edge 30 similar to the reverted edges 26 and 28 on the brackets 25 and 27, respectively.

A pair of hooks 31 and 32 are positioned opposite to the hooks 20 and 22, respectively, on the mounting plate 17. The hooks 31 and 32 are secured to the mounting plate 17 by any suitable means. An elongated hook 33 is positioned mid-way between the hooks 31 and 32 and opens in the same direction as the hooks 31 and 32.

A pin 34 having a cylindrical cross-section is provided with a head 35 at one end thereof. A second cylindrical pin 36 is similarly provided with a head 37 at one end thereof.

A transparent tinted lens 38 having a trapezoidal cross-section is secured to the pin 34 along one edge thereof and is provided with slots 39 and 40 adjacent the pin 34 for purposes to be described. A transparent tinted lens 41 is secured to the pin 36 along one edge thereof and is provided with slots 42 and 43 adjacent opposite side edges thereof at their juncture with the pin 36. The pin 34 is journalled in the arcuate bracket 27 at the end thereof adjacent the head 35 and has its opposite end portion journalled in the bracket 29. The pin 36 is journalled in the bracket 25 adjacent the end having the head 37 thereon, while its opposite end is journalled in the bracket 29.

In the use and operation of the invention, the mounting plate 17 is moved laterally of the visor 13 so that the hooks 22 and 20 engage over the edge 15 of the visor and the hooks 31, 32 and 33 engage over the edge 14 of the visor detachably securing the mounting plate 17 thereto. The lower edge portion of the mounting plate 17 extends below the lower edge of the visor 13 to serve as a continuation of the visor, while the lenses 38 and 41 are pivoted to the mounting plate 17 permitting them to be positioned below the visor in order to intersect blinding light rays from the sun. The construction of the mounting plate 17 is such that it can be moved laterally as indicated in Figure 4, so that the glare fender portion 18 will intercept light rays which would normally come between the visors 13. In this position of the mounting plate 17 the hooks 20, 22, 32, 31 and 33 are sufficient to secure the mounting plate 17 to the visor 13.

The glare shield mounting plate 17 can also be moved to the left so that the glare fender portion 19 will intercept the light rays coming past the left end of the visor 13.

Obviously, the lenses 38 and 41 can be reversed from the position shown to permit the thicker lens portion to be on the inside instead of on the outside.

It is obvious that either lens 38 or 41 can be moved to a position to intercept light rays while the opposite lens 38 or 41 is left in folded position against the visor 13.

the lower edge of said mounting plate, a pair of elongated hinge pins detachably supported in said brackets, and a pair of glare shields, said glare shields being directly connected respectively to said hinge pins for pivotal movement in said brackets.

2. A device as claimed in claim 1, wherein the glare shields have a substantially trapezoidal configuration, said glare shields having slots adjacent their opposite side edges registering with said brackets.

References Cited in the file of this patent

UNITED STATES PATENTS

| | | |
|---|---|---|
| 1,599,183 | Phillips | Sept. 7, 1926 |
| 1,694,552 | Menczer | Dec. 11, 1928 |
| 2,118,198 | Hathaway | May 24, 1938 |
| 2,184,360 | Nichols | Dec. 26, 1939 |
| 2,477,680 | Young | Aug. 2, 1949 |
| 2,603,530 | Jones | July 15, 1952 |

FOREIGN PATENTS

| | | |
|---|---|---|
| 468,066 | Italy | Dec. 29, 1951 |